United States Patent
Chang et al.

(10) Patent No.: US 8,325,155 B2
(45) Date of Patent: Dec. 4, 2012

(54) TOUCH PANEL

(75) Inventors: Yu-Shuan Chang, Hsinchu (TW);
Hsueh-Ying Huang, Hsinchu (TW);
Min-Feng Chiang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 530 days.

(21) Appl. No.: 12/565,062

(22) Filed: Sep. 23, 2009

(65) Prior Publication Data

US 2010/0315377 A1 Dec. 16, 2010

(30) Foreign Application Priority Data

Jun. 16, 2009 (TW) .............................. 98120044 A

(51) Int. Cl.
*G06F 3/042* (2006.01)
(52) U.S. Cl. ........................................................ 345/175
(58) Field of Classification Search .................. None
See application file for complete search history.

(56) References Cited

U.S. PATENT DOCUMENTS

| | | | | |
|---|---|---|---|---|
| 6,998,660 B2 * | 2/2006 | Lyon et al. | ..................... | 257/294 |
| 7,280,167 B2 * | 10/2007 | Choi et al. | ..................... | 349/12 |
| 7,573,459 B2 * | 8/2009 | Shih et al. | ..................... | 345/104 |
| 7,995,041 B2 * | 8/2011 | Chang | ..................... | 345/173 |
| 2009/0200088 A1 * | 8/2009 | Chuang | ..................... | 178/18.01 |
| 2010/0156851 A1 * | 6/2010 | Kurokawa | ..................... | 345/175 |

\* cited by examiner

*Primary Examiner* — K. Wong
(74) *Attorney, Agent, or Firm* — McClure, Qualey & Rodack LLP

(57) ABSTRACT

A touch panel is provided. The touch panel includes a plurality of pixels, wherein each pixel includes M*N sub-pixels, at least m sub-pixels each include at least one photo sensitive area and at least one effective display area, the other n sub-pixels each include only at least one effective display area, and $M \geq 2$, $N \geq 1$, $m \leq M$, $m+n=M$ and $m \geq 0$. A first color filter film is disposed over a photo sensor of the photo sensitive area and a second color filter film is disposed over the effective display area, wherein the color of the first and the second color filter films are different at the at least m sub-pixels. The photo sensors at the same column are electrically connected by a signal readout line, wherein only one signal readout line is disposed at every M column of the sub-pixels.

23 Claims, 14 Drawing Sheets

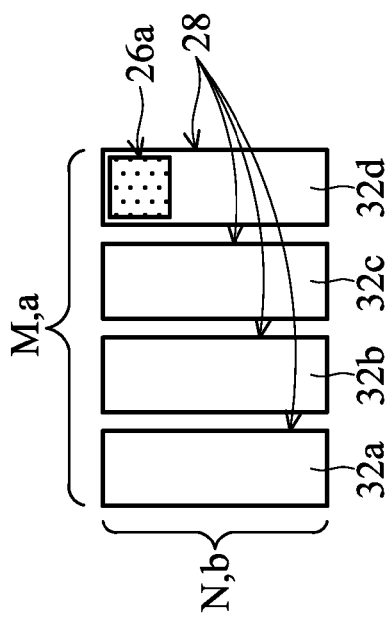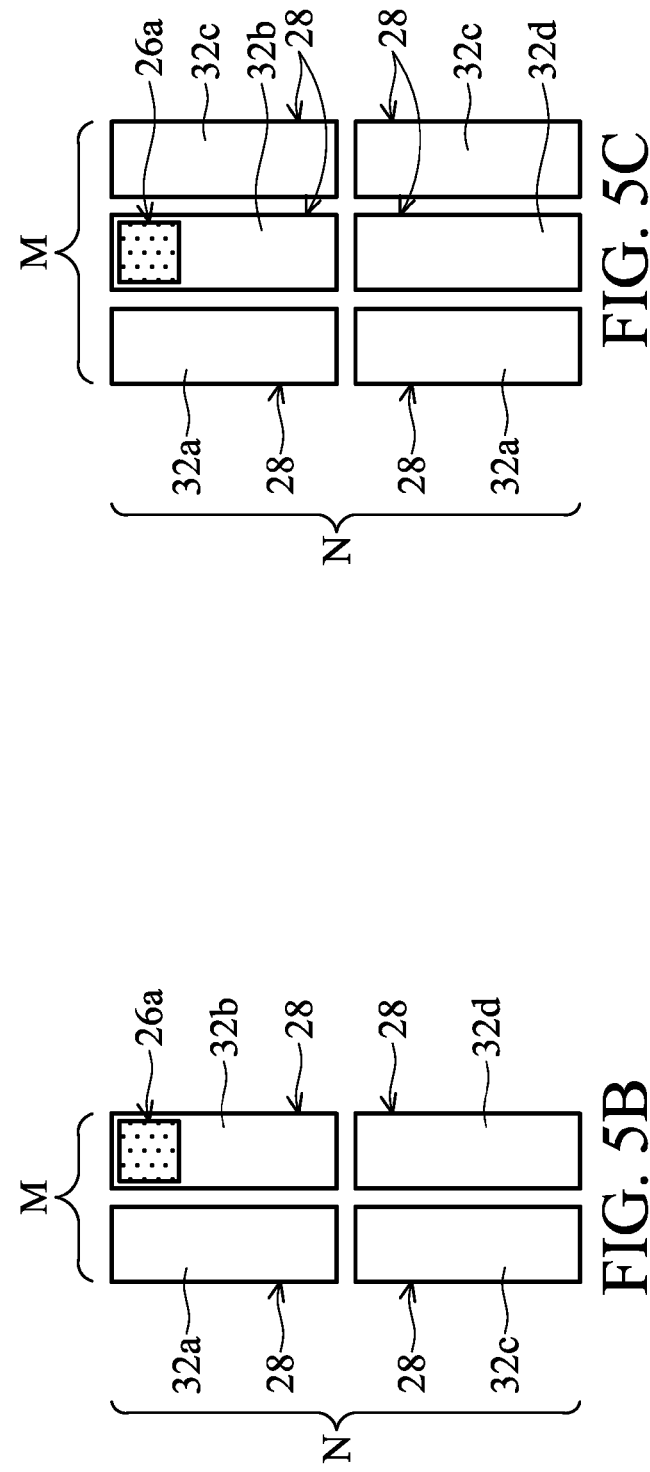

TOUCH PANEL

CROSS REFERENCE TO RELATED APPLICATIONS

This Application claims priority of Taiwan Patent Application No. 98120044, filed on Jun. 16, 2009, the entirety of which is incorporated by reference herein.

BACKGROUND OF THE INVENTION

1. Field of the Invention

The present invention relates to a touch panel, and in particular relates to a photo sensitive touch panel.

2. Description of the Related Art

Conventional photo sensitive touch panels comprise a sensor thin film transistor (sensor TFT), a readout thin film transistor (readout TFT), and a capacitor for photo sensing function. After the touch panel is illuminated, an amorphous silicon semiconductor layer of the sensor TFT produces a leakage current, a current value of the sensor TFT is read out through the readout TFT and then a voltage value is obtained. The voltage value can represent the strength of light illuminating to the touch panel. Photo sensitive touch panels can be induced by finger pressure or a light pen. The leakage current of the sensor TFT is reduced when a finger pressure thereupon and the leakage current of the sensor TFT is increased when using a light pen. Both of the leakage currents can be distinguished from a read out voltage value in the touch panel without the finger pressure or the light pen.

FIG. 1 shows an illustrative plane view of a sub-pixel of a conventional photo sensitive touch panel. The touch panel has a plurality of sub-pixels 11. Each sub-pixel 11 is defined by two adjacent data lines 10 and two adjacent scan lines 12. Each sub-pixel 11 has one photo sensitive area 16 and one display area 18, and a photo sensor (not shown) is disposed at the photo sensitive area 16. For conventional photo sensitive touch panels, when using a light pen with a light source of three individual colors of red, green, and blue (RGB), each photo sensor thereof needs to be disposed under one of three kinds of RGB color resists for sensing the three light source colors individually. Each of the RGB photo sensors are usually disposed at the sub-pixels with respective RGB color filter films. Therefore, at the single sub-pixel 11 of the conventional photo sensitive touch panels, the color filter films over the photo sensitive area 16 and the display area 18 have the same color. Additionally, pixel electrodes over the photo sensitive area 16 and the display area 18 share the same pixel electrode at the single sub-pixel 11, and the pixel electrodes over the photo sensitive area 16 and the display area 18 are not separated. Thus, the color of light sensed by the photo sensor at the photo sensitive area is the same as the color of the light passing through the display area 18.

Moreover, each photo sensor at each photo sensitive area 16 needs to be connected with a signal readout line 14 for reading signals. Additionally, each sub-pixel has one photo sensor disposed therein, such that each column of the sub-pixels has one signal readout line 14 to connect all photo sensors at one column of the sub-pixels. Therefore, the conventional photo sensitive touch panels have a plurality of signal readout lines 14, which reduces aperture ratio thereof. Additionally, the signal readout line 14 is adjacent to the data line 10, such that the signal readout line 14 may easily interfere with the data line 10, which causes readout errors.

Therefore, a photo sensitive touch panel which can overcome the above mentioned problems, having a higher aperture ratio and reducing readout errors is desired.

BRIEF SUMMARY OF THE INVENTION

According to an illustrative embodiment, a touch panel is provided. The touch panel comprises: a plurality of pixels, wherein each pixel includes M*N sub-pixels, and the M*N sub-pixels have at least m sub-pixels each containing at least one photo sensitive area and at least one effective display area; at least n other sub-pixels of the M*N sub-pixels each only contain at least one effective display area, and $M \geq 2$, $N \geq 1$, $m \leq M$, $m+n=M$ and $m \geq 0$; and the at least one photo sensitive area has at least one photo sensor. A color filter is disposed at the pixels, wherein the color filter contains a first color filter film disposed over the photo sensors of the at least m sub-pixels of the M*N sub-pixels, and a second color filter film disposed over the effective display areas of the at least m sub-pixels of the M*N sub-pixels and the effective display areas of the at least n other sub-pixels of the M*N sub-pixels, and the first color filter film disposed over the photo sensors of the at least m sub-pixels of the M*N sub-pixels have a color different from that of a color of the second color filter film disposed over the effective display areas of the at least m sub-pixels. In addition, a signal readout line is disposed to electrically connect the photo sensors at the same column, wherein only one signal readout line is disposed at every M columns of the sub-pixels.

According to an illustrative embodiment, a touch panel is provided. The touch panel comprises: a plurality of pixels, wherein each pixel at least includes a first sub-pixel, a second sub-pixel and a third sub-pixel, the first sub-pixel contains at least one photo sensitive area and at least one effective display area, the photo sensitive area contains at least one photo sensor, and the second sub-pixel and the third sub-pixel contain at least one effective display area. A color filter is disposed at the pixels, wherein the color filter contains a first color filter film covering the photo sensor of the first sub-pixel, and a second color filter film covering the effective display areas of the first, the second and the third sub-pixels. A signal readout line is disposed for electrically connecting the photo sensors.

According to an illustrative embodiment, a touch panel is provided. The touch panel comprises: a plurality of sub-pixels, displaying A kinds of colors; a plurality of photo sensors, each sensing a light source having B kinds of colors, wherein A*B sub-pixels of the sub-pixels have B pieces of the photo sensors, and $A \geq B$ and $B \geq 2$. A first color filter film is disposed over the photo sensors and a second color filter film is disposed over an effective display area of the sub-pixels, wherein at the A*B sub-pixels. The first color filter film disposed over at least B−1 pieces of the photo sensors has a color different from that of a color of the second color filter film disposed over the effective display area of the sub-pixel having the photo sensor therein. In addition, a signal readout line is disposed for electrically connecting the photo sensors at the same column, wherein only one signal readout line is disposed at every A column of the sub-pixels.

According to an illustrative embodiment, a touch panel is provided. The touch panel comprises a plurality of touch signal readout lines, wherein the touch signal readout lines at least contain a first signal readout line connecting to a plurality of photo sensors, and wherein the photo sensors at least contain a first photo sensor and a second photo sensor. A plurality of color filters is disposed over the photo sensors, wherein the color filter disposed over the first photo sensor has a main frequency band which is different from that of a main frequency band of the color filter disposed over the second photo sensor.

According to an illustrative embodiment, a touch panel is provided. The touch panel comprises: a plurality of touch signal readout lines, wherein the touch signal readout lines at least contain a first signal readout line and a second signal readout line; each of the touch signal readout lines connect to each of a corresponding plurality of photo sensors; and the photo sensors of the first signal readout line at least contain a first photo sensor and the photo sensors of the second signal readout line at least contain a first photo sensor. A plurality of color filters is disposed over the photo sensors, wherein the color filter disposed over the first photo sensor of the first signal readout line has a main frequency band which is different from that of a main frequency band of the color filter disposed over the first photo sensor of the second signal readout line.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 5A-5C show illustrative arrangements of the sub-pixels at each pixel of the touch panel according to various embodiments of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In an embodiment of the invention, a touch panel is provided. The touch panel has a plurality of pixels, wherein each pixel contains a plurality of sub-pixels. Each pixel has at least one photo sensor disposed therein, wherein only one photo sensor disposed at one sub-pixel of each pixel is preferred, such that the amount of signal readout lines in the touch panel can be reduced and the aperture ratio of the panel is increased. Meanwhile, the positions of the signal readout line and the data line do not interfere with each other. Thus, the probability of readout error of the touch panel is reduced.

In an embodiment of the touch panel of the invention, each color filter film is disposed over each photo sensor. A color of the color filter film disposed over the photo sensor may be substantially different from that of a color of the color filter film disposed over the effective display area of the sub-pixel with the photo sensor therein. A light source with several colors can be sensed, by using the color filter films over the photo sensors. In other words, the light sensed by the photo sensor has a color substantially different from that of a color of the light passing through the effective display area of the sub-pixel with the photo sensor therein. In addition, a pixel electrode disposed over a photo sensitive area is physically separated from a pixel electrode disposed over the effective display area of the sub-pixel with the photo sensor therein, such that it can prevent the two pixel electrodes from interfering with each other.

Figure 1:
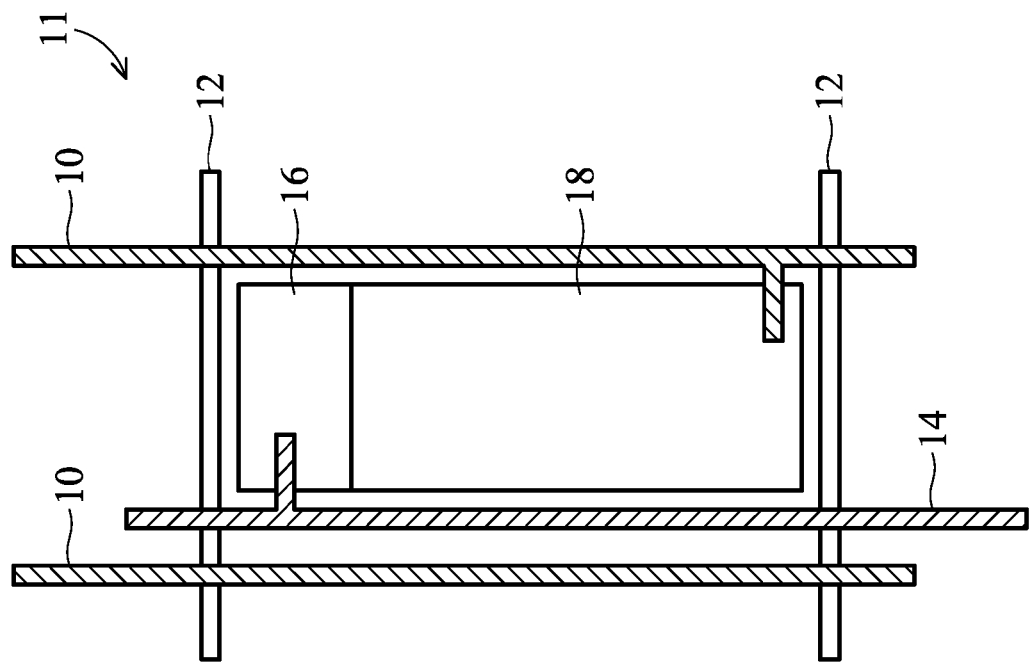
FIG. 1 shows an illustrative plane view of a sub-pixel of a conventional photo sensitive touch panel.
Figure 2A:
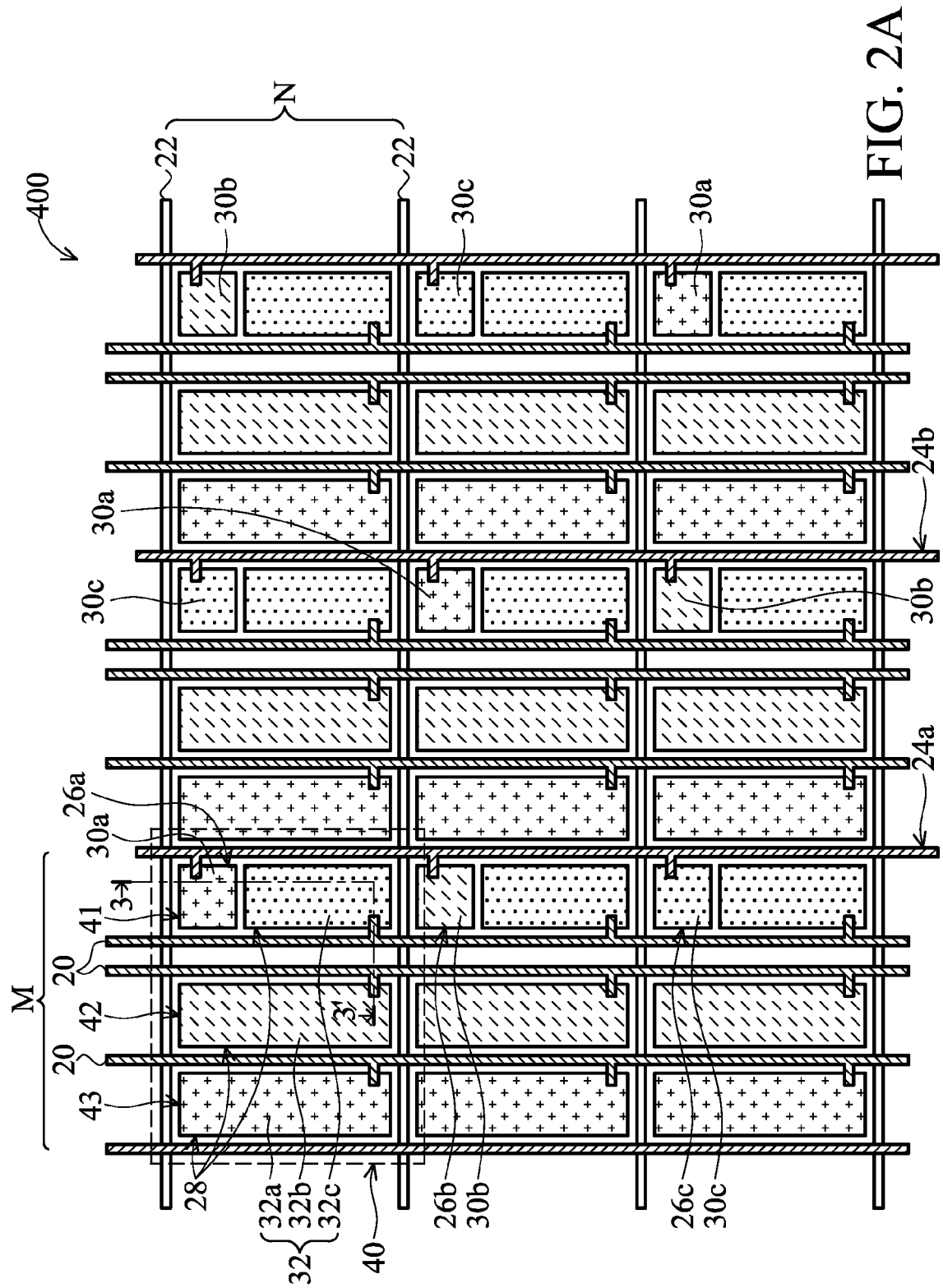
FIGS. 2A-2D show illustrative plane views of a touch panel according to various embodiments of the invention.

FIG. 2A shows an illustrative plane view of a touch panel according to an embodiment of the invention. The touch panel has a plurality of pixels 40. Each pixel 40 contains M*N sub-pixels, for example, but the invention is not limited to just three sub-pixels 41, 42 and 43. Other sub-pixel amount may be used, for example two, four, five, six, eight or nine sub-pixels etc. Each pixel has at least m sub-pixels, for example one sub-pixel 41, contains at least one photo sensitive area 26a and at least one effective display area 28, and the others at least n sub-pixels of each pixel, for example each two sub-pixels 42 and 43, only contain at least one effective display area 28, wherein $M \geq 2$, $N \geq 1$, $m \leq M$, m+n=M, and $m \geq 0$. In a preferred embodiment, $M \geq 2$, $N \geq 1$, $m \leq M$, m+n=M, and m>0. In an embodiment, M=3, N=1, m=1, and n=2. In other words, in an embodiment of the invention, m sub-pixels may each have at least one photo sensitive area 26a and at least one effective display area 28 and none of the other sub-pixels contain a photo sensitive area 26a, i.e. n=0. Each the at least m sub-pixels of each pixel is defined by one data line 20, one signal readout line 24a and two adjacent scan lines 22. The others at least n sub-pixels of each pixel are each defined by two adjacent data lines 20 and two adjacent scan lines 22. In addition, at least one photo sensitive area 26a has at least one photo sensor (not shown), for example a photo sensor TFT disposed therein. The photo sensors at the photo sensitive areas 26a, 26b and 26c of the same column are electrically connected by the same signal readout line 24a and only one signal readout line is disposed at the sub-pixels of every M columns.

A color filter is disposed at the pixel 40. The color filter contains a first color filter film 30a and a second color filter film 32. The second color filter film 32 contains a first, a second and a third sub-color filter films 32a, 32b and 32c, and the first, the second and the third sub-color filter films 32a, 32b and 32c have substantially different colors. The color of the first color filter film 30a is selected from one of the first, the second and the third sub-color filter films 32a, 32b and 32c. The colors of the first, the second and the third sub-color filter films 32a, 32b and 32c are, as an example, and not limited to, red, green and blue (RGB). Other color coordinates can also be used for the first, the second and the third sub-color filter films 32a, 32b and 32c, for example yellow, violet, brown, orange, grey or indigo etc. The first color filter film 30a is disposed over the photo sensor at the photo sensitive area 26a of the first sub-pixel 41. The second color filter film 32 is disposed over the effective display areas 28 of the first, the second and the third sub-pixels 41, 42 and 43. The color of the first color filter film 30a disposed over the photo sensor is substantially different to the color of the third sub-color filter film 32c disposed over the effective display area 28 of the first sub-pixel 41 having the photo sensor therein.

As shown in FIG. 2A, the first color filter film 30a disposed over the photo sensitive area 26a of the first sub-pixel 41 is for example a red color filter film, the second color filter film 32c disposed over the effective display area 28 of the first sub-pixel 41 is for example a blue color filter film, the second color filter film 32b disposed over the effective display area 28 of the second sub-pixel 42 is for example a green color filter film and the second color filter film 32a disposed over the effective display area 28 of the third sub-pixel 43 is for example a red color filter film. The arrangement of the second color filter film 32 over the effective display areas 28 for each pixel is the same as the above description.

Moreover, the first color filter film 30b disposed over the photo sensitive area 26b is for example a green color filter film and the first color filter film 30c disposed over the photo sensitive area 26c is for example a blue color filter film. As shown in FIG. 2A, the photo sensors at the photo sensitive areas 26a, 26b and 26c are aligned along the same column, and the colors of the first color filter films 30a, 30b and 30c disposed over the photo sensitive areas at the same row are substantially different. As shown in the arrangement of FIG. 2A, the photo sensors at the photo sensitive areas 26a, 26b and 26c for sensing different colors can be centralized, such that the size of a light source for providing different colors light can be reduced.

Figure 2B:
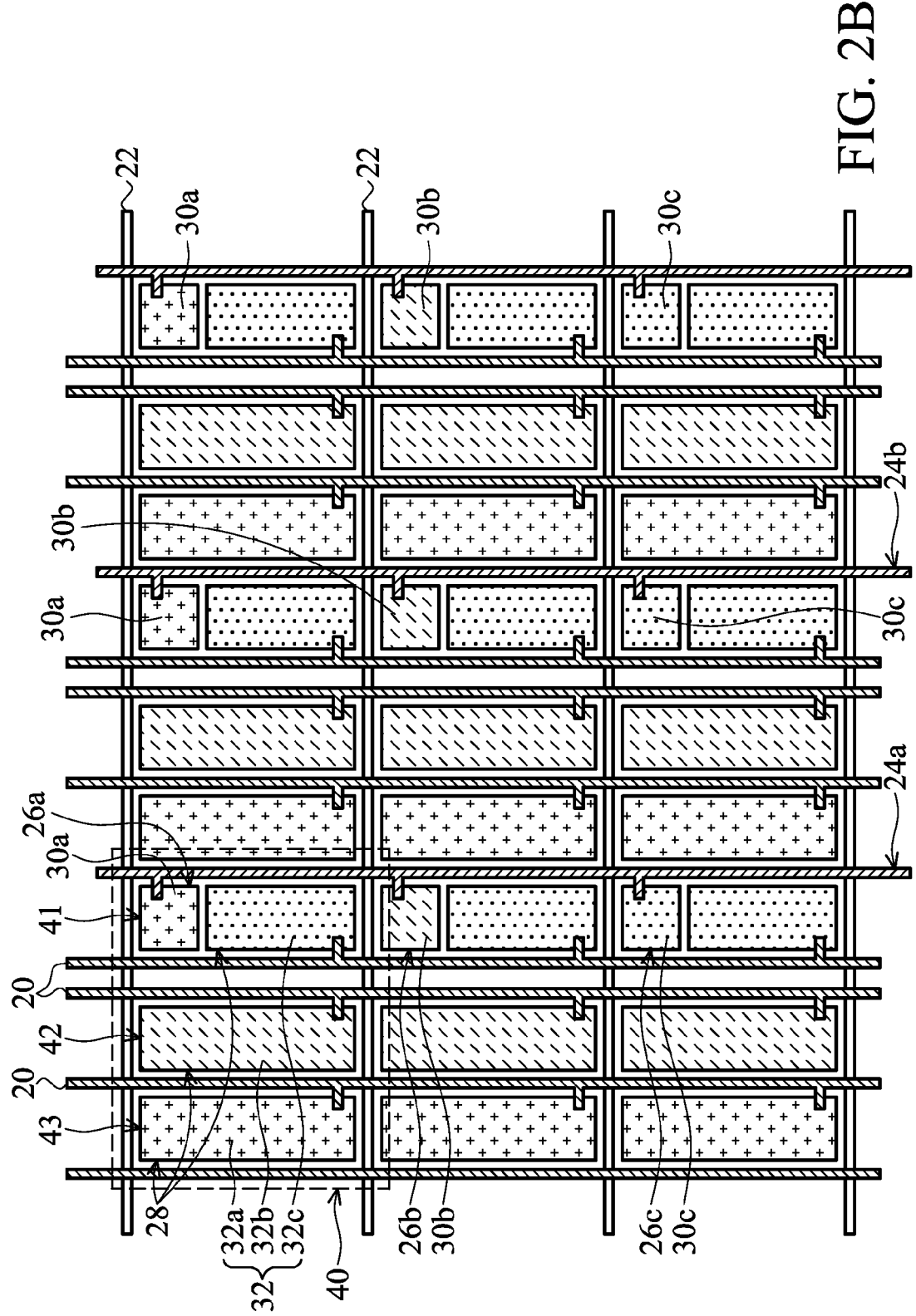

FIG. 2B shows an illustrative plane view of a touch panel according to an embodiment of the invention. The difference between FIG. 2B and FIG. 2A is that the colors of the first color filter films 30a disposed over the photo sensitive areas 26a at the same row are the same.

Figure 2C:
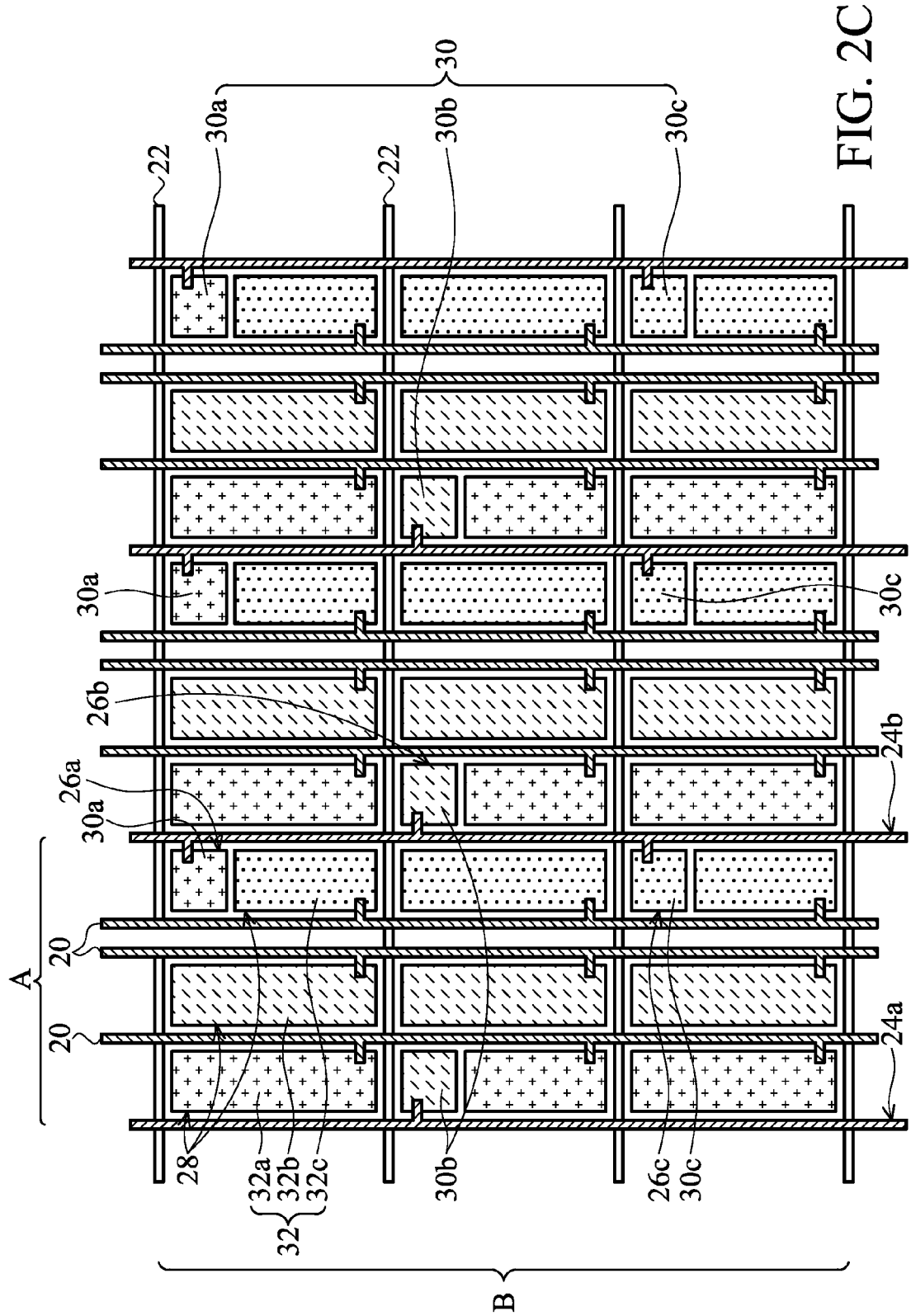

FIG. 2C shows an illustrative plane view of a touch panel according to an embodiment of the invention. The difference between FIG. 2C and FIG. 2A is that the photo sensors at the photo sensitive areas 26a, 26b and 26c along a vertical direction, i.e. the direction of the signal readout line 24 are arranged zigzagged and the colors of the first color filter films 30a disposed over the photo sensitive areas 26a at the same row are the same.

Figure 2D:
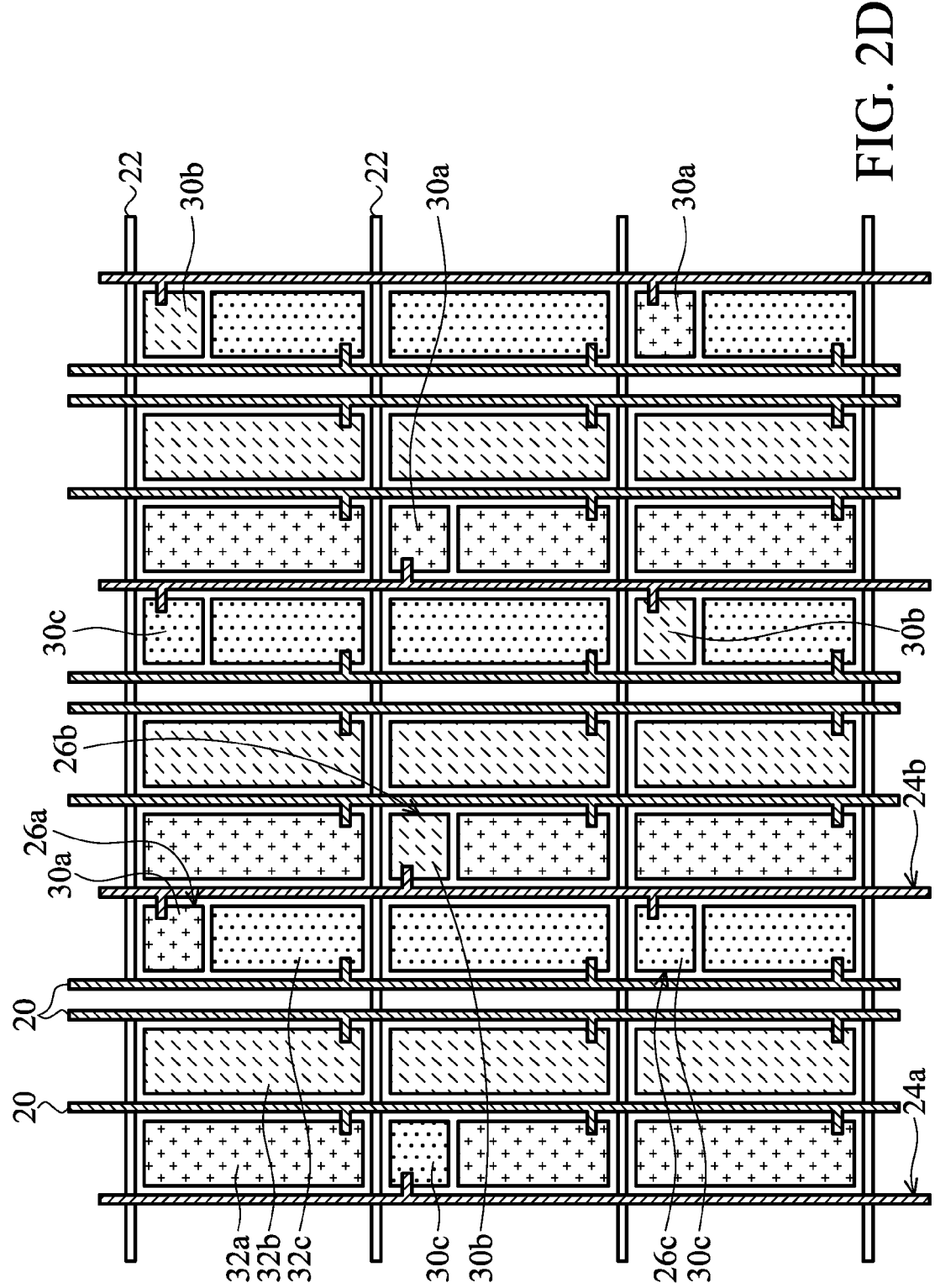

FIG. 2D shows an illustrative plane view of a touch panel according to an embodiment of the invention. The difference between FIG. 2D and FIG. 2A is that the photo sensors at the photo sensitive areas 26a, 26b and 26c along a vertical direction, i.e. the direction of the signal readout line 24 are arranged zigzagged.

Referring to FIG. 2C again, in an embodiment of the invention, the touch panel contains a plurality of sub-pixels, and the sub-pixels display A kinds of colors. Additionally, the touch panel further has a plurality of photo sensors disposed at the photo sensitive areas 26a, 26b and 26c. The photo sensors sense a light source consisted of several individual lights with B kinds of colors. Only B pieces of photo sensors are disposed at A*B sub-pixels, and A≧B and B≧2. In an embodiment, for example and not limited to, A=3 and B=3. The combinations of other numbers can also be used, wherein the first color filter film 30a is disposed over the photo sensor of the photo sensitive area 26a and the second color filter film 32 is disposed over the effective display areas 28 of the sub-pixels. The color of the first color filter film 30a disposed over the photo sensor may be substantially different to the color of the second color filter film 32c disposed over the effective display area of the sub-pixel having the photo sensor therein. In addition, the photo sensors at the same column, for example the photo sensors at the photo sensitive areas 26a and 26c are electrically connected by the signal readout line 24. Only one signal readout line 24 is disposed at the sub-pixels of every A columns.

Figure 3:
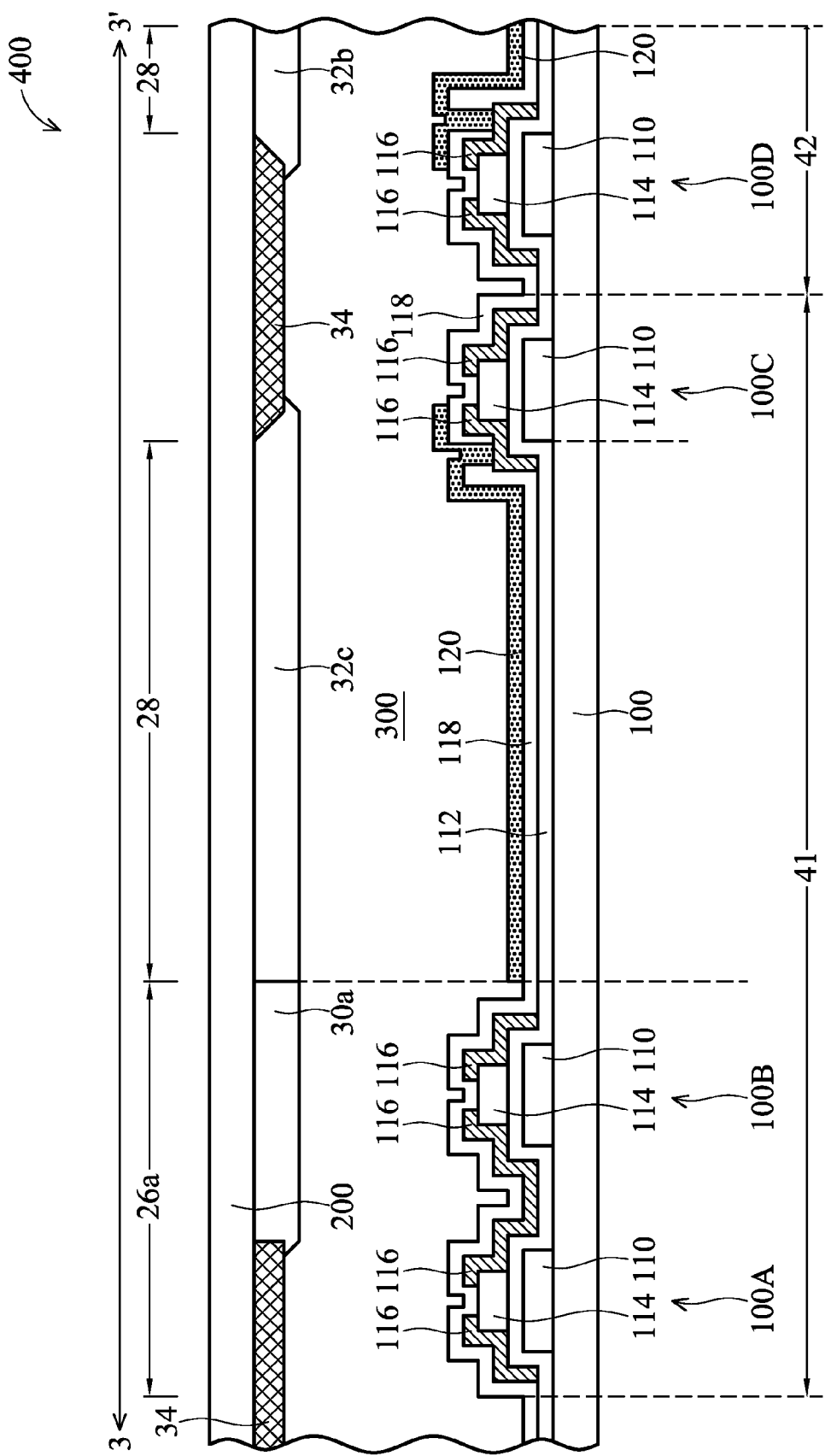
FIG. 3 shows an illustrative cross section of a touch panel along the cross section line 3-3' of FIG. 2A.

Next, referring to FIG. 3, an illustrative cross section of a touch panel 400 along the cross section line 3-3' of FIG. 2A is shown. The touch panel 400 contains a first substrate 100 and a second substrate 200 disposed opposite to the first substrate 100. A display medium layer 300, for example and not limited to, a liquid crystal layer is disposed between the first substrate 100 and the second substrate 200. The display medium layer 300 may be an electrophoresis layer, a flowing powder layer, a light-emitting layer or etc. A plurality of data lines 20 and scan lines 22 as shown in FIG. 2A are disposed crisscrossed on the first substrate 100 to form a plurality of sub-pixels. A first sub-pixel 41 and a second sub-pixel 42 are formed on the first substrate 100. A signal readout TFT 100A, a photo sensor TFT 100B and a control TFT 100C are disposed at the first sub-pixel 41. A control TFT 100D is disposed at the second sub-pixel 42. The first sub-pixel 41 contains a photo sensitive area and an effective display area and the second sub-pixel 42 exclusively contains an effective display area. The signal readout TFT 100A is electrically connected with the photo sensor TFT 100B for receiving the signals from the photo sensor TFT 100B.

First, a patterned first conductive layer 110 is formed on the first substrate 100 for each gates of the signal readout TFT 100A, the photo sensor TFT 100B and the control TFTs 100C and 100D. Then, a first dielectric layer (or namely a gate insulating layer) 112 is formed to cover the first conductive layer 110. A patterned semiconductor layer 114 is formed on the first dielectric layer 112 and then a source/drain 116 is formed on the semiconductor layer 114. A second dielectric layer (or namely a passivation layer) 118 is formed to cover the source/drain 116 to form the signal readout TFT 100A, the photo sensor TFT 100B and the control TFTs 100C and 100D. Then, a pixel electrode 120 is formed on the second dielectric layer 118, wherein the pixel electrode 120 is only disposed at the effective display area of each sub-pixel, or the pixel electrode 120 is physical separately disposed at the effective display area and the photo sensitive area of each sub-pixel, and the pixel electrodes at the two areas are physically separated and not connected. In addition, the signal readout line (not shown in FIG. 3) and the photo sensor TFT 100B are disposed on the first substrate together. The signal readout TFT 100A and the photo sensor TFT 100B are connected in series, i.e. the drain 116 of the signal readout TFT 100A is connected with the source 116 of the photo sensor TFT 100B. The control TFTs 100C and 100D are electrically insulated by each other, i.e. the pixel electrode 120 of the sub-pixel 41 is controlled by the control TFT 100C and the pixel electrode 120 at the effective display area 28 of the sub-pixel 42 is controlled by the control TFT 100D.

An area on the second substrate 200 can also be divided into a photo sensitive area 26a, an effective display area 28 of the first sub-pixel 41 and an effective display area 28 of the second sub-pixel 42. The areas of the second substrate 200 are corresponding to the above mentioned areas of the first substrate 100. The first color filter film 30a is disposed at the photo sensitive area 26a. The third and the second sub-color filter films 32c and 32b are each disposed at the effective display areas 28 of the first sub-pixel 41 and the second sub-pixel 42. In addition, a black matrix layer 34 is disposed on the second substrate 200, which is corresponding to the first substrate 100 for dividing the first sub-pixel 41 and the second sub-pixel 42 of the first substrate 100. Moreover, the signal readout TFT 100A is further covered by the black matrix layer 34 at the photo sensitive area, i.e. the semiconductor layer 114 of the signal readout TFT 100A is covered by the black matrix layer 34 and the covering area of the black matrix layer 34 is extended to exceed a projective area of the semiconductor layer 114, such that the signal readout TFT 100A is not interfered with by outside light. However, the photo sensor TFT 100B is not covered by the black matrix layer 34, i.e. the semiconductor layer 114 of the photo sensor TFT 100B is not covered by the black matrix layer 34.

Moreover, in an embodiment of the invention, the first color filter films 30a, 30b and 30c and the second color filter film 32a, 32b and 32c can be disposed over the TFTs on the first substrate 100 to form a touch panel with a color filter on array (COA).

Figure 4A:
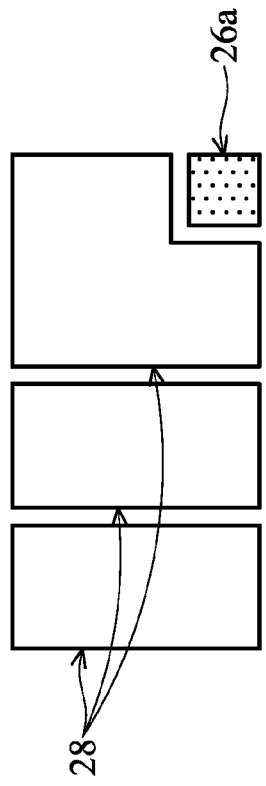
FIGS. 4A-4F show illustrative arrangements of the photo sensitive areas at each pixel of the touch panel according to various embodiments of the invention.
Figure 4B:
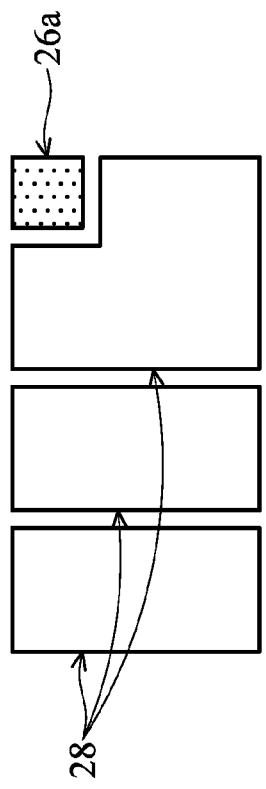
Figure 4C:
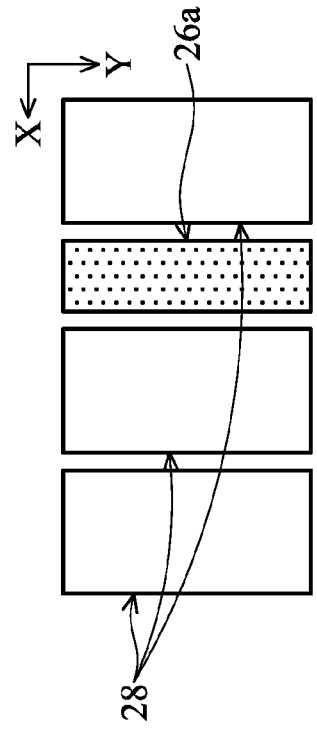
Figure 4D:
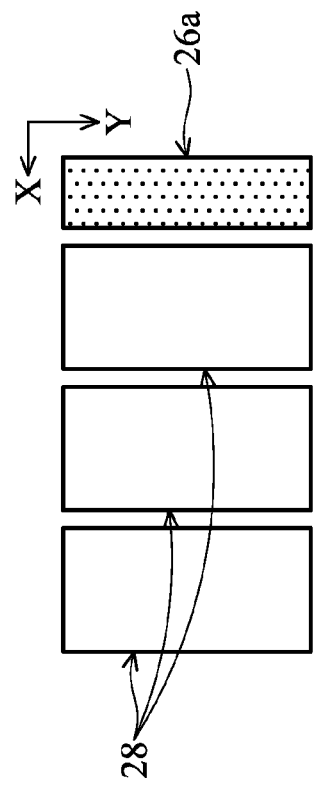
Figure 4F:
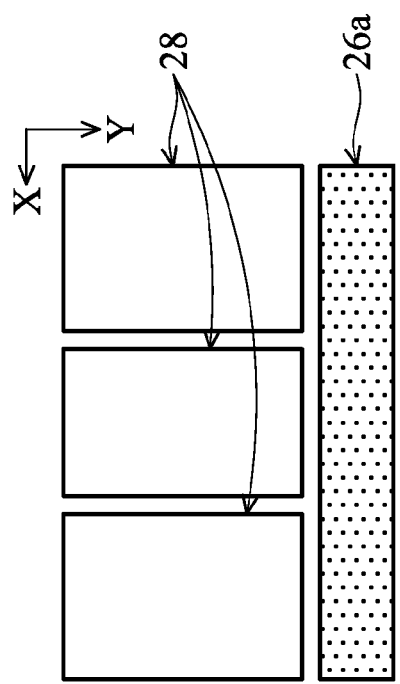
Figure 4E:
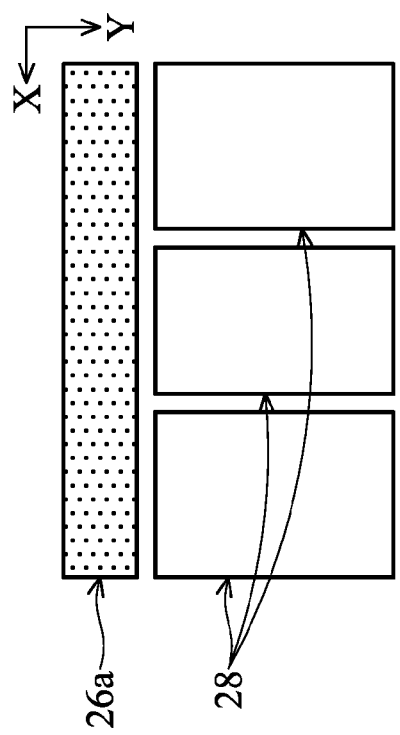

Next, Referring to FIGS. 4A-4F, illustrative arrangements of the photo sensitive areas at each pixel of the touch panel according to various embodiments of the invention are shown. In addition to the photo sensitive area arrangements of FIGS. 2A-2D, as shown in FIGS. 4A and 4B, the photo sensitive area 26a can be disposed at any corner of one sub-pixel of each pixel to form a complete sub-pixel with a photo sensitive area. Additionally, as shown in FIGS. 4C and 4D, the photo sensitive area 26a can be disposed at a left side or a right side of one sub-pixel of each pixel, wherein the photo sensitive area 26a has a length, i.e. a long side (or a side at a Y-axis direction) substantially equal to a length of other sub-pixel 28, i.e. a long side (or a side at a Y-axis direction) of the sub-pixel 28. Moreover, as shown in FIGS. 4E and 4F, the photo sensitive area 26a can be disposed at an upper side or a lower side of each sub-pixel of each pixel, wherein the photo sensitive area 26a has a width, i.e. a long side (or a side at a X-axis direction) substantially equal to the sum of widths of the sub-pixels 28, i.e. the sum of short side (or a side at a X-axis direction) of the sub-pixels 28. Additionally, the disposition of the photo sensor at each pixel is not limited to a fixed location. Therefore, in an embodiment of the invention, the photo sensors can be aligned along the same row, or the photo sensors can be arranged zigzagged at a horizontal direction, i.e. a direction of the scan line.

Although the above embodiments are illustrated with each pixel containing M*N=3 sub-pixels, however, in other embodiments of the invention, each pixel may have four, five or six sub-pixels and the sub-pixels of each pixel can be arranged in a strip type or a matrix type manner. Referring to FIGS. 5A and 5B, wherein each pixel contains M*N=4 sub-pixels. As shown in FIG. 5A, four sub-pixels are arranged in a strip type manner, wherein M=4, and N=1. As shown in FIG. 5B, four sub-pixels are arranged in a matrix type manner, wherein M=2, and N=2, and colors of the color filter films 32a, 32b, 32c and 32d covering each sub-pixel can be different, for example colors of the color filter films 32a, 32b, 32c and 32d may each be one of red, green, blue and white (RGBW). In addition, as shown in FIG. 5C, each pixel may contain M*N=6 sub-pixels, wherein M=3, and N=2. The colors of the color filter films 32a, 32b, 32c and 32d covering four sub-pixels of each pixel can be different, for example each may be one of red, green, blue and white (RGBW). The colors of the color filter films covering the other two sub-pixels of each pixel can be selected from one of red, green, blue and white (RGBW). Referring to FIG. 5A again, wherein each pixel may contain at least a*b sub-pixels. One sub-pixel of the a*b sub-pixels, for example the sub-pixel 32d contains at least a photo sensitive area 26a and at least an effective display area 28, wherein the photo sensitive area 26a contains at least a photo sensor (not shown). The other sub-pixels of the a*b sub-pixels, for example the sub-pixels 32a, 32b and 32c contain at least an effective display area 28 individually, wherein $a \geq 4$ and $b \geq 1$.

According to various embodiments of the invention, at each pixel, the number of the sub-pixel with the photo sensitive area therein may be one or more than one, for example at each pixel containing three sub-pixels, the number of the sub-pixel with the photo sensitive area therein may be one, two or three. At each pixel containing four sub-pixels, the number of the sub-pixel with the photo sensitive area therein may be one, two, three or four, and so on.

Figure 6:
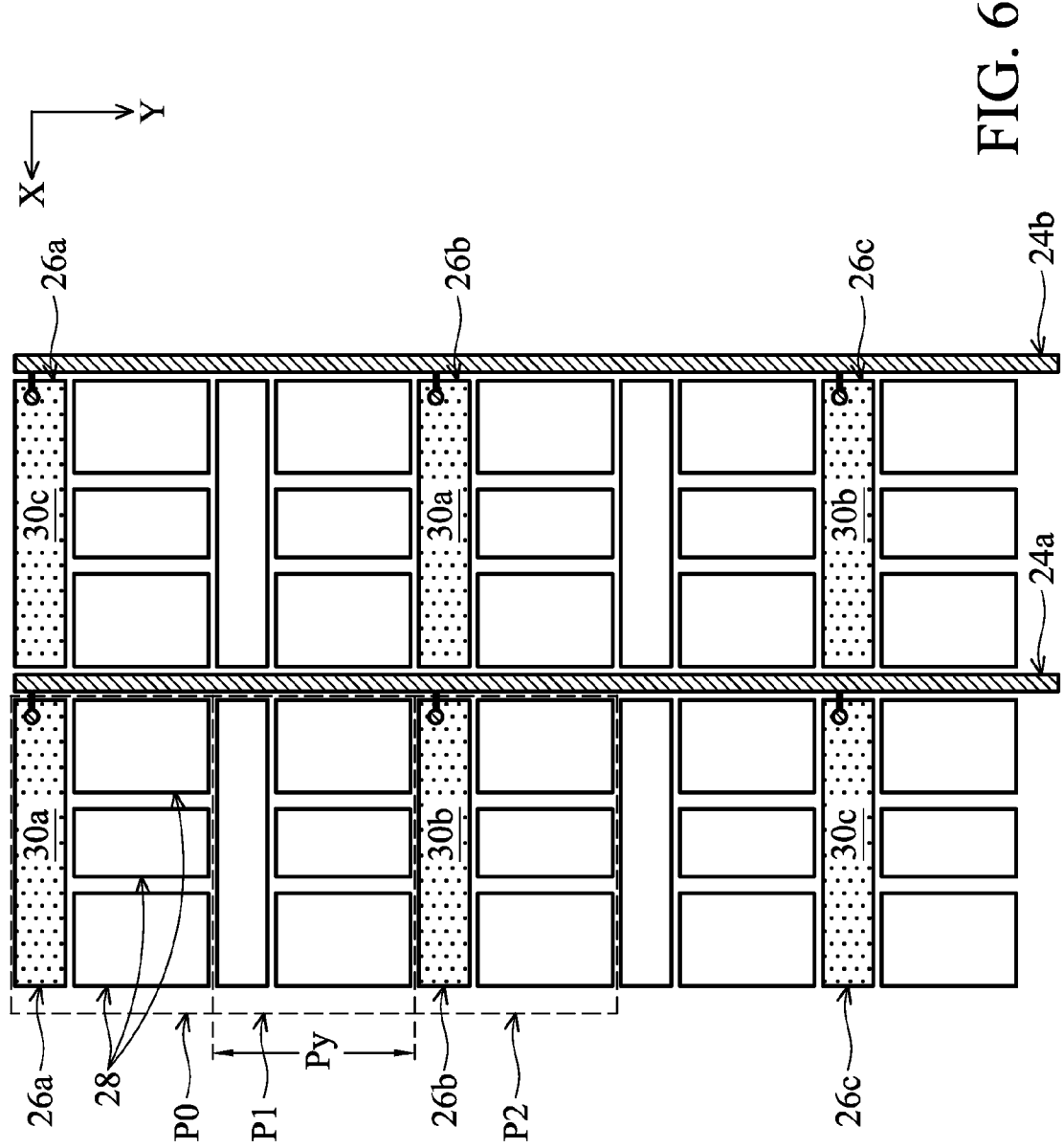
FIG. 6 shows an illustrative plane view of a touch panel according to an embodiment of the invention.

FIG. 6 shows an illustrative plane view of a touch panel according to an embodiment of the invention, wherein the photo sensitive areas 26a, 26b and 26c at the same signal readout line 24 can be disposed at intervals by one or more than one pixel pitch Py. The pixel pitch Py is defined by a length (or a length at a Y-axis direction) of one pixel. One pixel pitch Py represents a distance of one pixel, and the pixel has a plurality of sub-pixels. For example, the pixel with the photo sensitive area 26a is a pixel P0 and the next pixel with a plurality of sub-pixels behind the pixel P0 is a pixel P1 without any photo sensitive area 26a. Then, the pixel behind the pixel P1 is a pixel P2 with photo sensitive area therein, and so on. In another example, a pixel P0 may have no photo sensitive area therein, and the next pixel behind the pixel P0 is a pixel P1 with a photo sensitive area and the pixel behind the pixel P1 is a pixel P2 without any photo sensitive area 26a therein, and so on. Moreover, the pixels of the touch panel can be arranged in other examples by the combinations of the disposition of the pixel pitch Py to satisfy the characteristics of the touch panel of the invention.

Figure 7:
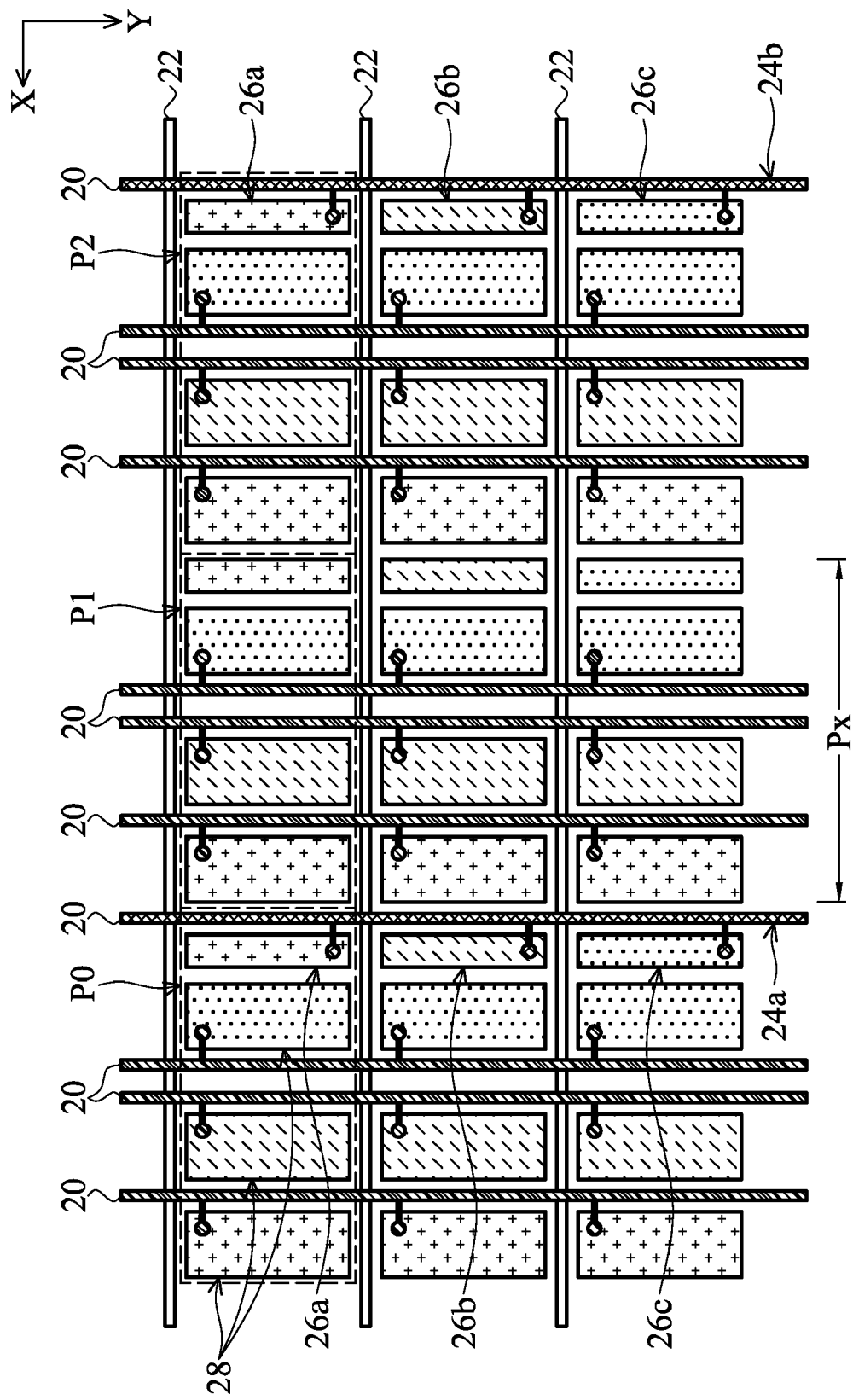
FIG. 7 shows an illustrative plane view of a touch panel according to an embodiment of the invention.

FIG. 7 shows an illustrative plane view of a touch panel according to an embodiment of the invention, wherein two adjacent signal readout lines 24a and 24b can be disposed at intervals by one or more than one pixel pitch Px. The pixel pitch Px is defined by a width (or a width at a X-axis direction) of one pixel. One pixel pitch Px represents a distance of one pixel, and the pixel has a plurality of sub-pixels. In an embodiment of FIG. 7, the two adjacent signal readout lines 24a and 24b are disposed at intervals by two pixel pitch Px. For example, the pixel with the signal readout line 24a is a pixel P0 and the next pixel, having a plurality of sub-pixels, behind the pixel P0 is a pixel P1 without any signal readout line. Then, the pixel behind the pixel P1 is a pixel P2 with the signal readout line 24b, and so on. In another example, a pixel P0 may have no signal readout line, and the next pixel behind the pixel P0 is a pixel P1 with a signal readout line and the pixel behind the pixel P1 is a pixel P2 without any signal readout line, and so on. Moreover, the pixels of the touch panel can be arranged in other examples by the combinations of the disposition of the pixel pitch Px to satisfy the characteristics of the touch panel of the invention.

Figure 8A:
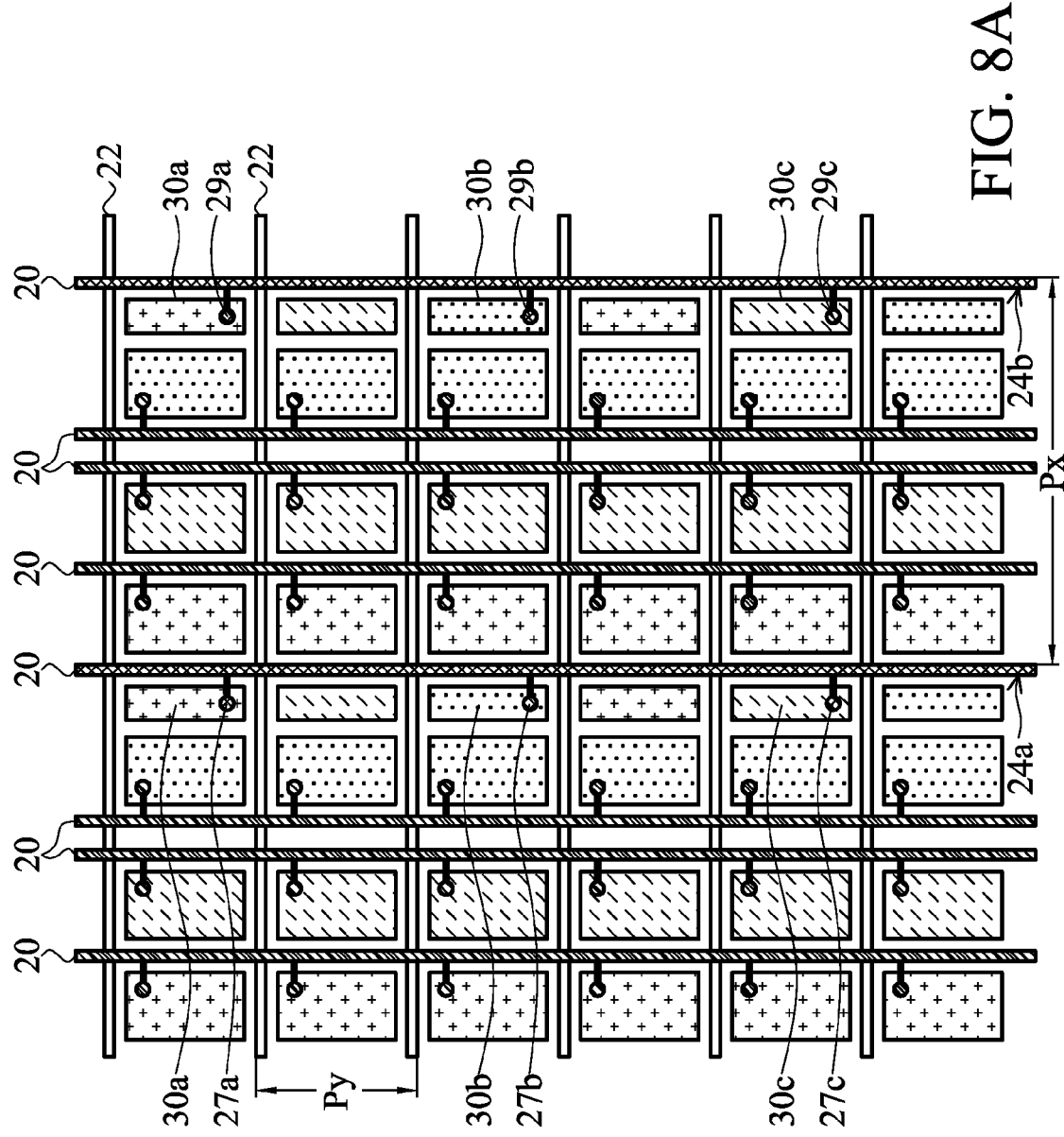
FIG. 8A shows an illustrative plane view of a touch panel according to an embodiment of the invention.

FIG. 8A shows an illustrative plane view of a touch panel according to an embodiment of the invention. The touch panel contains a plurality of touch signal readout lines 24a and 24b etc. A plurality of photo sensors 27a, 27b and 27c are disposed on the first touch signal readout line 24a and a plurality of photo sensors 29a, 29b and 29c are disposed on the second touch signal readout line 24b. The color filter films 30a, 30b and 30c covering the first photo sensor 27a, the second photo sensor 27b and the third photo sensor 27c have substantially different main frequency bands. Moreover, the sensing signal readout timings of the first photo sensor 27a, the second photo sensor 27b and the third photo sensor 27c are also different. In an embodiment, the color filter films 30a covering the first photo sensors 27a and 29a of the two adjacent signal readout lines 24a and 24b have the same main frequency band, for example a main frequency band of red color. Moreover, the sensing signal readout timing of the first photo sensor 27a of the signal readout line 24a is the same as that of the first photo sensor 29a of the signal readout line 24b. According to the definition of the pixel pitch Py in FIG. 6, in an embodiment of FIG. 8A, the photo sensors 27a, 27b and 27c on the same signal readout line 24a are disposed at intervals by one pixel pitch Py. The photo sensors 29a, 29b and 29c on the same signal readout line 24b are also disposed at intervals by one pixel pitch Py. According to the definition of the pixel pitch Px in FIG. 7, in an embodiment of FIG. 8A, the two adjacent signal readout lines 24a and 24b are disposed at intervals by one pixel pitch Px. Moreover, the photo sensitive areas on the same signal readout line can be disposed at intervals by more than one pixel pitch Py, and two adjacent signal readout lines can also be disposed at intervals by more than one pixel pitch Px.

Figure 8B:
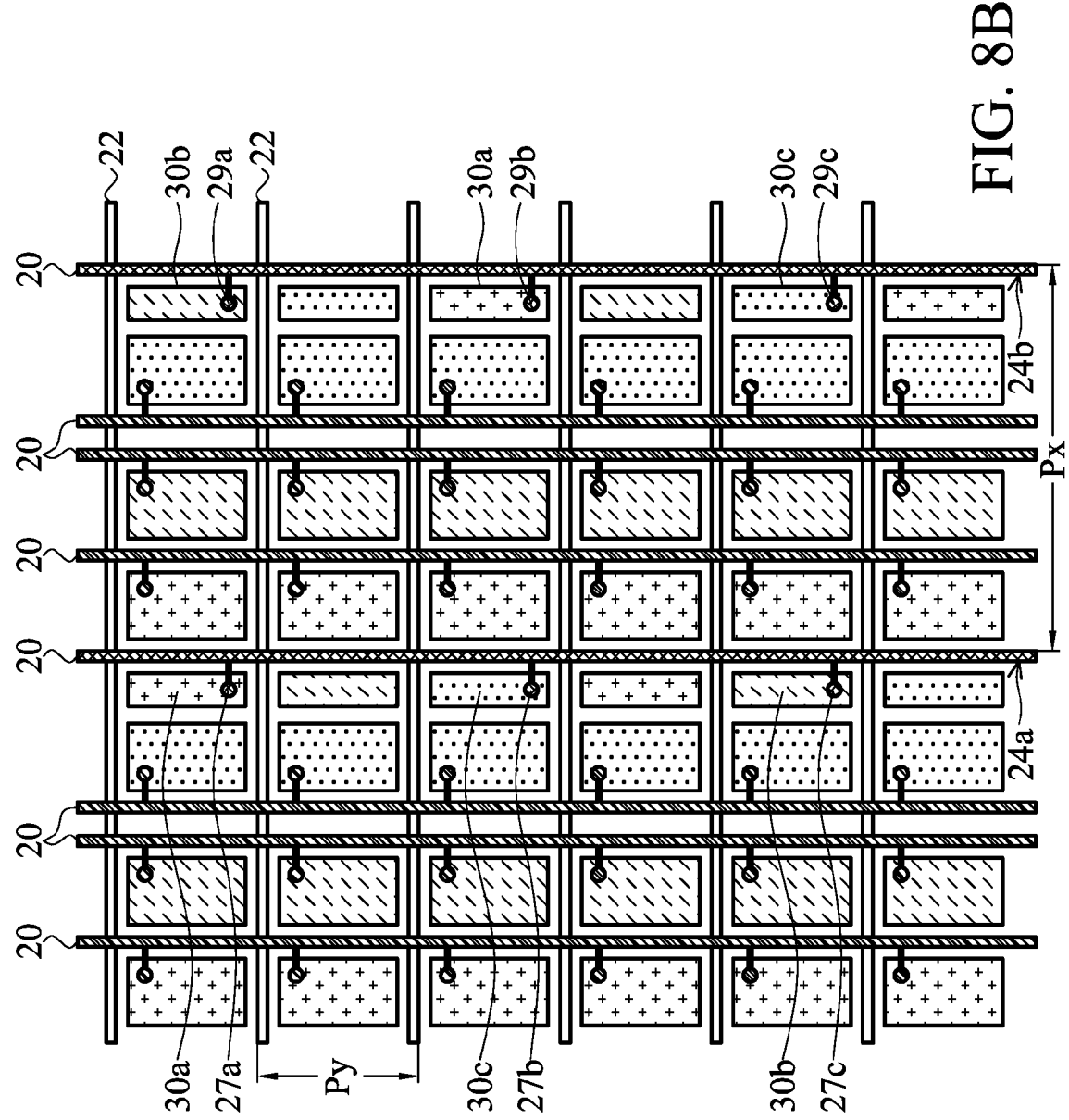
FIG. 8B shows an illustrative plane view of a touch panel according to an embodiment of the invention.

FIG. 8B shows an illustrative plane view of a touch panel according to an embodiment of the invention. The difference between FIG. 8B and FIG. 8A is that the color filter films 30a and 30b covering the first photo sensors 27a and 29a of the two adjacent signal readout lines 24a and 24b have substantially different main frequency bands, for example main frequency bands of red and green, respectively. Moreover, the sensing signal readout timing of the first photo sensor 27a of the signal readout line 24a is different to that of the first photo sensor 29a of the signal readout line 24b. According to the definition of the pixel pitch Py in FIG. 6, in an embodiment of FIG. 8b, the photo sensors 27a, 27b and 27c on the same signal readout line 24a are disposed at intervals by one pixel pitch Py. The photo sensors 29a, 29b and 29c on the same signal readout line 24b are also disposed at intervals by one pixel pitch Py. According to the definition of the pixel pitch Px in FIG. 7, in an embodiment of FIG. 8B, the two adjacent signal readout lines 24a and 24b are disposed at intervals by one pixel pitch Px. Moreover, the photo sensitive areas on the same signal readout line can be disposed at intervals by more than one pixel pitch Py, and two adjacent signal readout lines can also be disposed at intervals by more than one pixel pitch Px.

In addition, in the embodiments of the invention, the color filter films disposed over the photo sensors at the sub-pixels of an $M^{th}$ column have a color mix substantially the same as a color mix of the color filter films disposed over the photo sensors at the sub-pixels of an $M*p^{th}$ column, and $p \geq 1$. In the embodiments of the invention, the color filter films disposed over the photo sensors at the sub-pixels of the $N^{th}$ row have a color mix substantially the same as a color mix of the color filter films disposed over the photo sensors at the sub-pixels of the a $N*p^{th}$ row, and $p \geq 1$.

Moreover, in the embodiments of the invention, while each pixel only has one sub-pixel with the photo sensitive area therein, the sub-pixel with the photo sensitive area therein is defined by one data line, one signal readout line and two scan lines.

Figure 9:
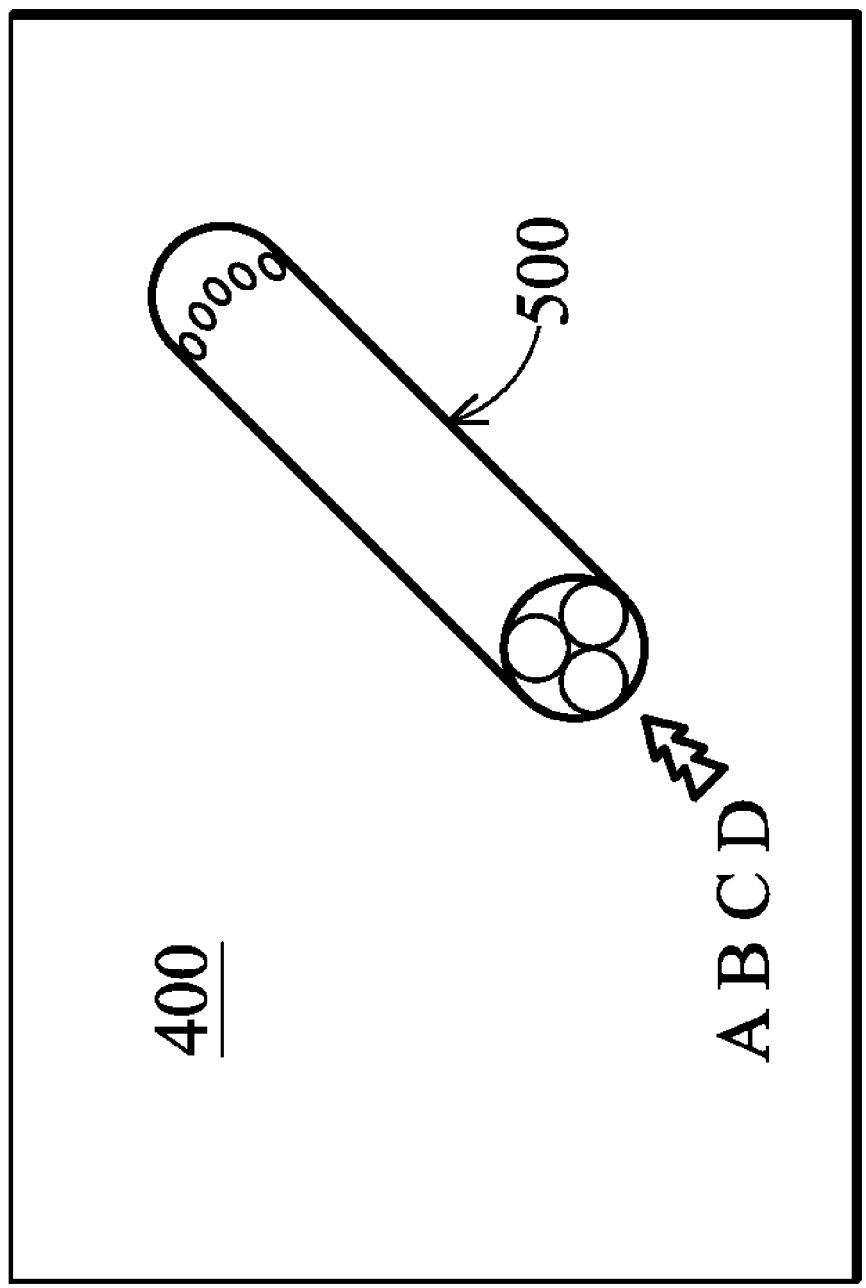
FIG. 9 schematically shows a touch panel including an input device according to an embodiment of the invention.

Next, referring to FIG. 9, a touch panel including an input device according to an embodiment of the invention is shown. An input device 500 is disposed over a touch panel 400. The touch panel 400 can be an embodiment of the above mentioned touch panel. The input device 500 can provide a light source with a plurality of colors, which is consisted of individual light sources with at least two kinds of frequency bands or colors. For example, the input device 500 may be a light pen with various colors. Utilizing the input device 500 to illuminate the touch panel 400, a main frequency band of the color filter film disposed over the photo sensor is the same as a frequency band of the light source of the input device 500, so that the light source of the frequency band is sensed by the photo sensor. For example, while the light source of the input device 500 contains a red light and the main frequency band of the color filter film disposed over the first photo sensor is red, the red light of the light source is sensed by the first photo sensor. Therefore, in an embodiment of the invention, the touch panel 400 may be used as an electric whiteboard and the input device 500 can be used as a light pen. The input device 500 can draw patterns and words with substantially different colors on the touch panel 400 and a light of the input device 500 with one kind of frequency band can be used for providing an eliminating signal to clean the patterns and words on the touch panel 400. For example, a white light of the input device 500 can be used to clean the patterns and words on the touch panel 400. Additionally, another input device can be used to clean the patterns and words on the touch panel 400. In addition, the input device 500 can also be used as an electronic mouse or a controller of games to co-operate with the touch panel 400.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel, comprising:
    a plurality of pixels, wherein each of the pixel includes M*N sub-pixels, and the M*N sub-pixels have at least m sub-pixels each containing at least one photo sensitive area and at least one effective display area, at least n other sub-pixels of the M*N sub-pixels each only contain at least one effective display area, and $M \geq 2$, $N \geq 1$, $m \leq M$, $m+n=M$ and $m \geq 0$, and the at least one photo sensitive area has at least one photo sensor;
    a color filter disposed at the plurality of pixels, wherein the color filter contains a first color filter film disposed over the photo sensors of the at least m sub-pixels of the M*N sub-pixels, and a second color filter film disposed over the effective display areas of the at least m sub-pixels of the M*N sub-pixels and the effective display areas of the at least n other sub-pixels of the M*N sub-pixels, and the first color filter film disposed over the photo sensors of the at least m sub-pixels of the M*N sub-pixels have a color different from that of a color of the second color filter film disposed over the effective display areas of the at least m sub-pixels; and
    a signal readout line electrically connecting the photo sensors at the same column, wherein only one signal readout line is disposed at every M columns of the sub-pixels.

2. The touch panel of claim 1, wherein the photo sensors are disposed parallel to a column of the sub-pixels or zigzagged along a vertical direction.

3. The touch panel of claim 1, wherein the first color filter film disposed over the photo sensors at the sub-pixels of an $M^{th}$ column have a color mix substantially the same as a color mix of the first color filter film disposed over the photo sensors at the sub-pixels of an $M*p^{th}$ column, or the first color filter film disposed over the photo sensors at the sub-pixels of the a $N^{th}$ row have a color mix substantially the same as a color mix of the first color filter film disposed over the photo sensors at the sub-pixels of the a $N*p^{th}$ row, and $p \geq 1$.

4. The touch panel of claim 1, further comprising:
    a first substrate;
    a second substrate disposed opposite to the first substrate;
    a display medium layer disposed between the first substrate and the second substrate;

a plurality of data lines and scan lines disposed criss-crossed on the first substrate to form the sub-pixels; and a plurality of pixel electrodes disposed on the first substrate, wherein each of the pixel electrodes is disposed corresponding to each of the sub-pixels, and the photo sensors and the signal readout line are disposed on the first substrate.

5. The touch panel of claim 1, further comprising an input device being adapted to provide a light source with a plurality of frequency bands or colors to illuminate the touch panel, wherein the light source is sensed by the photo sensor when a frequency band or a color of the first color filter film disposed over the photo sensor contains the frequency band or the color of the light source.

6. A touch panel, comprising:

a plurality of pixels, wherein each of the pixels includes a*b sub-pixels, a≧4 and b≧1, and the a*b sub-pixels at least include a first sub-pixel, a second sub-pixel and a third sub-pixel, and wherein the first sub-pixel contains at least one photo sensitive area and at least one effective display area, the photo sensitive area contains at least one photo sensor, and the second sub-pixel and the third sub-pixel contain at least one effective display area;

a color filter disposed at the plurality of pixels, wherein the color filter contains a first color filter film covering the photo sensor of the first sub-pixel, and a second color filter film covering the effective display areas of the first, the second and the third sub-pixels; and a signal readout line electrically connecting the photo sensors at the same column of the sub-pixels, wherein only one signal readout line is disposed at every a (a≧4) columns of the sub-pixels.

7. The touch panel of claim 6, wherein each of the second sub-pixel and the third sub-pixel exclusively contain the at least one effective display area, the second color filter film contains a first, a second and a third sub-color filter film disposed at the effective display area of the first sub-pixel, the effective display area of the second sub-pixel and the effective display area of the third sub-pixel, and the first color filter film covering the photo sensor is selected from one of the first, the second and the third sub-color filter films.

8. The touch panel of claim 6, further comprising:

a first substrate;

a second substrate disposed opposite to the first substrate;

a display medium layer disposed between the first substrate and the second substrate;

a plurality of data lines and scan lines disposed criss-crossed on the first substrate to form the sub-pixels; and a plurality of pixel electrodes disposed on the first substrate, wherein each of the pixel electrodes is disposed corresponding to each of the sub-pixel, and the photo sensors and the signal readout line are disposed on the first substrate.

9. The touch panel of claim 6, further comprising an input device for providing a light source with a plurality of colors to illuminate the touch panel, wherein the light source is sensed by the photo sensor when a color of the first color filter film disposed over the photo sensor is the same as the color of the light source.

10. A touch panel, comprising:

a plurality of sub-pixels, displaying A kinds of colors;

a plurality of photo sensors, sensing a light source having B kinds of colors, wherein A*B sub-pixels of the sub-pixels have B pieces of the photo sensors, and A≧B and B≧2;

a first color filter film disposed over the photo sensors;

a second color filter film disposed over an effective display area of the sub-pixels, wherein at the A*B sub-pixels, the first color filter film disposed over at least B−1 pieces of the photo sensors has a color different from that of a color of the second color filter film disposed over the effective display area of the sub-pixel having the photo sensor therein; and a signal readout line electrically connecting the photo sensors at the same column, wherein only one signal readout line is disposed at every A column of the sub-pixels.

11. The touch panel of claim 10, wherein the photo sensors are disposed parallel to a column of the sub-pixels or zigzagged along a vertical direction.

12. The touch panel of claim 10, wherein the photo sensors are disposed parallel to a row of the sub-pixels or zigzagged along a horizontal direction.

13. The touch panel of claim 10, further comprising:

a first substrate;

a second substrate disposed opposite to the first substrate;

a display medium layer disposed between the first substrate and the second substrate;

a plurality of data lines and scan lines disposed criss-crossed on the first substrate to form the sub-pixels; and a plurality of pixel electrodes disposed on the first substrate, wherein each of the pixel electrodes is disposed corresponding to each of the sub-pixel, and the photo sensors and the signal readout line are disposed on the first substrate.

14. The touch panel of claim 10, further comprising an input device for providing a light source with a plurality of colors to illuminate the touch panel, wherein the light source is sensed by the photo sensor when a color of the first color filter film disposed over the photo sensor is the same as the color of the light source.

15. A touch panel, comprising:

a plurality of touch signal readout lines, wherein the touch signal readout lines at least contain a first signal readout line connecting to a plurality of photo sensors at the same column of sub-pixels of the touch panel, a left column and a right column of sub-pixels adjacent to the column of the sub-pixels with the first signal readout line therein have no signal readout line, and wherein the photo sensors at least contain a first photo sensor and a second photo sensor; and a plurality of color filters disposed over the photo sensors, wherein the color filter disposed over the first photo sensor has a main frequency band which is different from that of a main frequency band of the color filter disposed over the second photo sensor.

16. The touch panel of claim 15, wherein the first photo sensor of the first signal readout line has a sensing readout time different from that of a sensing readout time of the second photo sensor of the first signal readout line.

17. The touch panel of claim 15, wherein the photo sensors of the first signal readout line further comprise a third photo sensor, and the color filters disposed over the first, the second and the third photo sensors has different main frequency bands.

18. The touch panel of claim 15, wherein the touch signal readout lines further comprise a second signal readout line connecting to a plurality of photo sensors, and the photo sensors at least contain a first photo sensor and a second photo sensor, and the color filter disposed over the first photo sensor of the first signal readout line has a main frequency band which is different from that of a main frequency band of the color filter disposed over the first photo sensor of the second signal readout line.

19. The touch panel of claim 15, wherein the touch signal readout lines further comprise a second signal readout line connecting to a plurality of photo sensors, and the photo sensors at least contain a first photo sensor and a second photo sensor, and the color filter disposed over the first photo sensor of the first signal readout line has a main frequency band that is the same as a main frequency band of the color filter disposed over the first photo sensor of the second signal readout line.

20. A touch panel, comprising:
a plurality of touch signal readout lines, wherein the touch signal readout lines at least contain a first signal readout line and a second signal readout line, each of the touch signal readout lines connect to each of a corresponding plurality of photo sensors at the same column of sub-pixels of the touch panel, at least one column of sub-pixels having no signal readout line therein is disposed between the first and the second signal readout lines, the photo sensors of the first signal readout line at least contain a first photo sensor and the photo sensors of the second signal readout line at least contain a first photo sensor; and
a plurality of color filters disposed over the photo sensors, wherein the color filter disposed over the first photo sensor of the first signal readout line has a main frequency band which is different from that of a main frequency band of the color filter disposed over the first photo sensor of the second signal readout line.

21. The touch panel of claim 20, wherein the touch signal readout lines further comprise a third signal readout line connecting to a plurality of photo sensors, the photo sensors at least contain a first photo sensor, and the color filters disposed over the first photo sensor of the first signal readout line, and the first photo sensor of the second signal readout line and the first photo sensor of the third signal readout line have different main frequency bands.

22. The touch panel of claim 20, wherein the first signal readout line further comprises a second photo sensor, and the color filters disposed over the first photo sensor and the second photo sensor of the first signal readout line have different main frequency bands.

23. The touch panel of claim 20, wherein the first signal readout line further comprises a second photo sensor, and the color filters disposed over the first photo sensor and the second photo sensor of the first signal readout line have the same main frequency bands.

* * * * *